United States Patent [19]
Young

[11] Patent Number: 5,566,625
[45] Date of Patent: *Oct. 22, 1996

[54] COMBUSTION APPARATUS INCLUDING PNEUMATICALLY SUSPENDED COMBUSTION ZONE FOR WASTE MATERIAL INCINERATION AND ENERGY PRODUCTION

[76] Inventor: Bob W. Young, 102 Windham La., Easley, S.C. 29642

[*] Notice: The term of this patent shall not extend beyond the expiration date of Pat. No. 5,408,942.

[21] Appl. No.: 424,889

[22] Filed: Apr. 19, 1995

Related U.S. Application Data

[63] Continuation of Ser. No. 103,457, Aug. 6, 1993, Pat. No. 5,408,942.
[51] Int. Cl.⁶ .................................................. F23G 5/00
[52] U.S. Cl. ........................... 110/243; 110/244; 110/251
[58] Field of Search .................................. 110/243, 244, 110/248, 251, 255

[56] References Cited

U.S. PATENT DOCUMENTS

| | | |
|---|---|---|
| 1,410,141 | 3/1922 | Thomas . |
| 3,099,131 | 7/1963 | Rosa . |
| 3,104,345 | 9/1963 | Wilcox et al. . |
| 3,122,663 | 2/1964 | Kach . |
| 3,149,252 | 9/1964 | Lapp . |
| 3,437,324 | 4/1969 | Wellons . |
| 3,536,018 | 10/1970 | Phelps ..................................... 110/244 |
| 3,577,940 | 5/1971 | Hasselbring et al. . |
| 3,581,683 | 6/1971 | Collier . |
| 3,675,600 | 7/1972 | Jones . |
| 3,773,001 | 11/1973 | Bottalico . |
| 3,858,534 | 1/1975 | Berg . |
| 3,958,920 | 5/1976 | Anderson . |
| 4,023,508 | 5/1977 | Cantrell, Jr. et al. . |
| 4,027,602 | 6/1977 | Mott . |
| 4,262,611 | 4/1981 | Kuhnert et al. ..................... 110/248 X |
| 4,385,567 | 5/1983 | Voss . |
| 4,398,477 | 8/1983 | Iwasoki . |
| 4,440,098 | 4/1984 | Adams . |
| 4,444,127 | 4/1984 | Spronz . |
| 4,509,435 | 4/1985 | Adams . |
| 4,538,529 | 9/1985 | Temelli . |
| 4,632,042 | 12/1986 | Chang . |
| 4,679,268 | 7/1987 | Adams . |
| 4,724,776 | 2/1988 | Foresto . |

FOREIGN PATENT DOCUMENTS

| | | |
|---|---|---|
| 3733735 | 4/1989 | Germany . |
| 106162 | 8/1924 | Switzerland . |

OTHER PUBLICATIONS

International search report dated 16 Nov. 1994 in PCT/US 94/18743, published 16 Feb. 1955 as No. WO 95/04898.

*Primary Examiner*—Henry A. Bennett
*Assistant Examiner*—Susanne C. Tinker
*Attorney, Agent, or Firm*—Carter & Schnedler, P.A.

[57] ABSTRACT

High temperature combustion apparatus incorporating a pneumatically suspended combustion zone and capable of supporting relatively high combustion temperatures, in excess of 2400° C. (4352° F.) for essentially total combustion with minimal pollutant production. The combustion apparatus may be employed for waste material incineration in general, toxic waste incineration, and for smokeless burning of wood and vegetation. The combustion apparatus may be employed in an efficient steam electric power generating plant which employs municipal solid waste as fuel, and/or in combination with a magnetohydrodynamic (MHD) electric generator. The pneumatically suspended combustion zone is created by having streams of combustion air directed upwardly from a floor grate and from the sides of a combustion chamber such that combustion occurs in a swirling turbulent mass which does not directly contact either the walls or the floor of the combustion chamber. The relatively high combustion temperatures are sustained by providing a high volume of excess combustion air, the same combustion air which maintains the pneumatically suspended combustion zone. High combustion temperatures are contained with little use of refractory materials, and without melting the combustion chamber sidewalls.

14 Claims, 14 Drawing Sheets

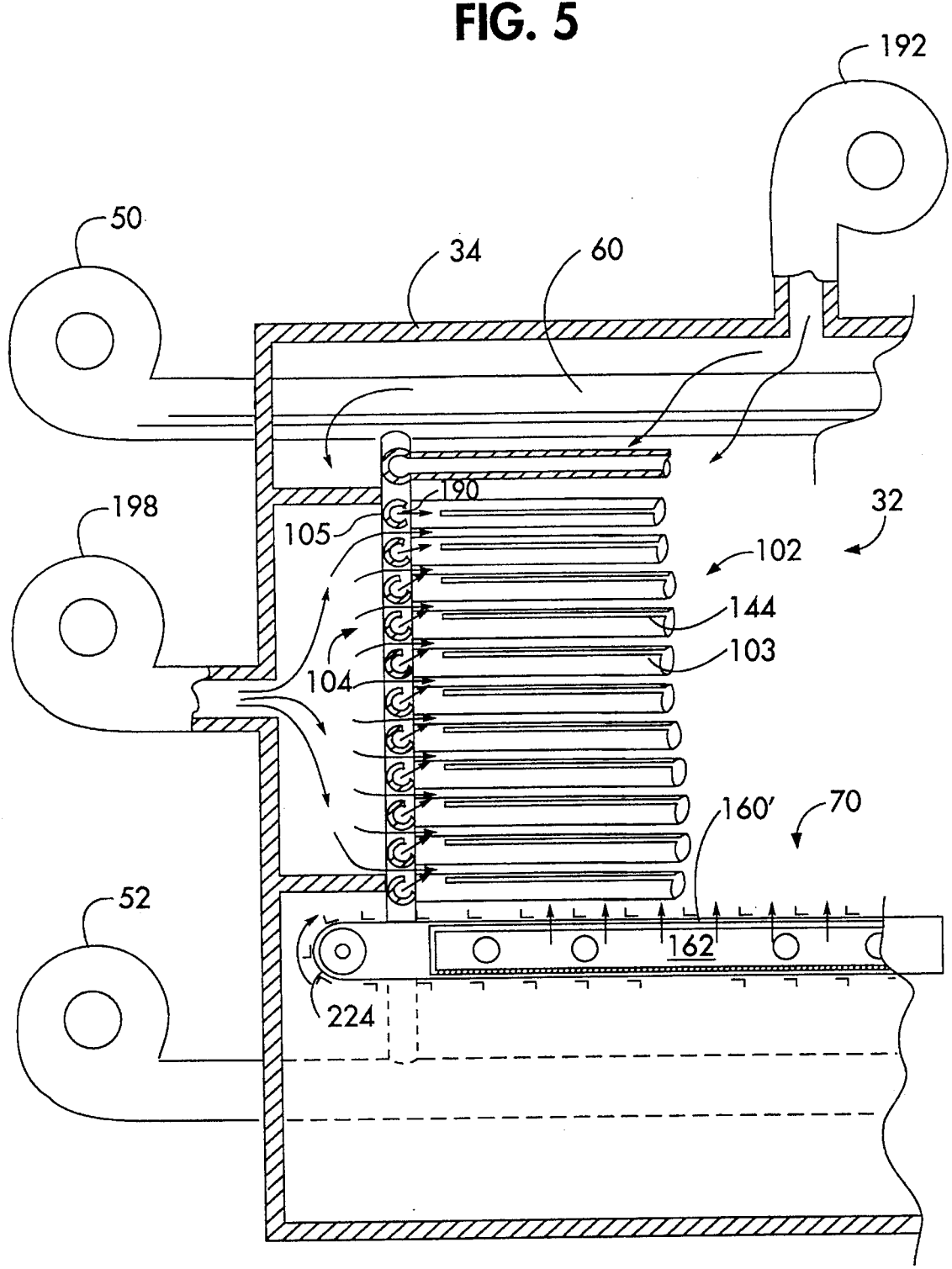

COMBUSTION APPARATUS INCLUDING PNEUMATICALLY SUSPENDED COMBUSTION ZONE FOR WASTE MATERIAL INCINERATION AND ENERGY PRODUCTION

CROSS-REFERENCE TO RELATED APPLICATION

This is a continuation of application Ser. No. 08/103,457, filed Aug. 6, 1993, now U.S. Pat. No. 5,408,942.

BACKGROUND OF THE INVENTION

The present invention relates generally to combustion apparatus for waste material incineration in general, toxic waste incineration, refuse burning, and power generation, and, more particularly, to combustion apparatus capable of supporting combustion temperatures in excess of 2400° C. (4352° F.) for essentially total combustion with minimal pollutant production.

Incinerator/furnace/boiler combustion chamber designs presently available for applications such as municipal solid waste disposal, industrial solid waste disposal, toxic waste disposal, coal and oil fired electric power generating plants, and the like, include combustion chambers made of refractory materials such as fire brick, which are generally limited to an approximately 1300° C. (approximately 2400° F.) maximum combustion temperature. Although higher temperature refractory materials are available, their cost is prohibitive for most applications.

It is, however, desirable to employ even higher combustion temperatures. Higher combustion temperatures offer a number of advantages. Higher combustion temperatures in general result in more complete burning, reducing the need for exhaust gas scrubbing. There is the potential for totally combusting toxic materials, reducing the need for exhaust gas scrubbing following toxic waste incineration. In steam power generation applications, higher combustion temperatures in addition result in more efficient operation. Steam temperatures in excess of approximately 980° C. (approximately 1800° F.) are particularly efficient. Another advantage of high combustion temperatures, particularly in the context of municipal trash incineration, is that light gauge metal objects contained in the solid waste materials are melted by the exposure to extreme temperatures. These light gauge metal objects ultimately become small pieces of metal which are easily carried away as ash.

SUMMARY OF THE INVENTION

It is accordingly an object of the invention to provide combustion apparatus capable of supporting relatively high combustion temperatures, in excess of 2400° C. (4352° F.).

It is another object of the invention to provide such apparatus in which the use of refractory materials in combustion chamber construction is minimized.

It is another object of the invention to provide a highly efficient and non-polluting municipal waste incinerator, thus substantially reducing landfill usage.

Another object of the invention is to provide efficient combustion apparatus for retrofit to existing coal or oil fueled power generation plants such that municipal solid waste can be used as a fuel for power generation.

Briefly, and in accordance with an overall aspect of the invention, high temperature combustion apparatus incorporates a pneumatically suspended combustion zone created by having streams of combustion air directed upwardly from a floor grate and from the sides of a combustion chamber such that combustion occurs in a swirling turbulent mass which does not directly contact either the walls or floor of the combustion chamber. Relatively high combustion temperatures are sustained by providing a high volume of excess combustion air, the same combustion air which maintains the pneumatically suspended combustion zone. High combustion temperatures can be contained with little use of refractory materials, and without melting the combustion chamber sidewalls.

In one particular embodiment of the invention, combustion apparatus includes walls defining a combustion chamber having a pneumatically suspended combustion zone, and at least portions of the walls are formed of a plurality of adjacent tubes having tube interiors and tube walls. At least one tube supply blower is connected to the tubes for pressurizing the tube interiors with combustion-supporting gas, such as air. The tube walls have openings, such as slots, oriented generally towards the combustion zone, and the tubes and slots extend horizontally. Preferably, the openings are oriented so as to induce swirling gas flow movement within the combustion zone.

Thus combustion-supporting gas streams are directed out of the openings to at least partially define the combustion zone and to force the heat of combustion away from the walls. Typically, the tubes comprise metal, and at least portions of the walls are free of refractory materials. However, in some embodiments, the tubes comprise a refractory material, such as silicon carbide.

Preferably, the tubes forming the walls of the combustion chamber are spaced from each other, and there is an outer containment structure surrounding the combustion chamber walls. At least one outer containment structure supply blower is connected for pressurizing the outer containment structure with combustion-supporting gas, such as air, so that combustion-supporting gas streams are directed between the tubes into the combustion chamber, in addition to the combustion air streams directed out of the tube slots. Vanes preferably are affixed to the tubes for controlling the direction of combustion-supporting gas streams directed between the tubes.

The outer containment structure preferably is subdivided into a plurality of outer containment zones supplied by separate blowers such that combustion air is supplied at different rates from different zones to facilitate adjustment of combustion parameters.

In one embodiment, the combustion apparatus takes the form of a tunnel-like structure wherein solid waste material is introduced near one end by a solid waste material supply conveyor and travels towards the other end where there is an exhaust gas port and an ash conveyor exit. The ash conveyor, also termed a combustion chamber conveyor, includes conveyor elements which are driven over a floor grate having spaced grate elements between which combustion-supporting gas streams are directed upwardly. The combustion chamber conveyor serves to convey heavy objects through the combustion apparatus, as well as to convey non-combusted particles to an ash collection system. In addition, an entry point for hydrocarbon fuel such as oil or powdered coal may be provided near where solid waste material is introduced.

A chamber defining an outer containment zone is mounted at the one end of the combustion chamber, directly opposite the exhaust port. Pressurized combustion air is forced into this chamber at a relatively higher volume compared to other areas of the outer containment structure in order to force the swirling turbulent motion of the combustion process away from the solid waste conveyor entry point and the hydrocarbon fuel entry point, towards the opposite end of the combustion chamber to the exhaust gas port and ash conveyor exit.

Another aspect of the invention is the preheating of solid waste material to nearly its flash point before introduction into the combustion chamber. In one embodiment, the solid waste material supply conveyor runs within a pressurized chamber, and includes conveyor elements moving over a grate, with hot combustion-supporting gas directed upwardly through the grate. The pressurized chamber has a revolving door type entry door which receives waste material, while maintaining pressure within the pressurized chamber. Higher pressure is maintained within the pressurized waste material supply conveyor chamber than in the combustion chamber, resulting in pneumatically assisted injection of waste material into the combustion chamber.

In another embodiment of the invention, the combustion chamber walls include a multiplicity of openings oriented generally towards the combustion zone, and there is at least one blower in gas flow communication with these openings for directing combustion-supporting gas through the openings to at least partially define a combustion zone and to force the heat of combustion away from the walls. Preferably, an outer containment structure surrounds the walls, and the blower is connected for pressurizing the outer containment structure with combustion-supporting gas, such as air, so that combustion-supporting gas is directed from within the outer containment structure through the openings. In this particular embodiment, the combustion chamber walls preferably comprise refractory materials.

BRIEF DESCRIPTION OF THE DRAWINGS

While the novel features of the invention are set forth with particularity in the appended claims, the invention, both as to organization and content, will be better understood and appreciated, from the following detailed description, taken in conjunction with the drawings, in which:

FIG. 5 is an enlarged view of the left side of FIG. 4B;

DETAILED DESCRIPTION

Figure 1:
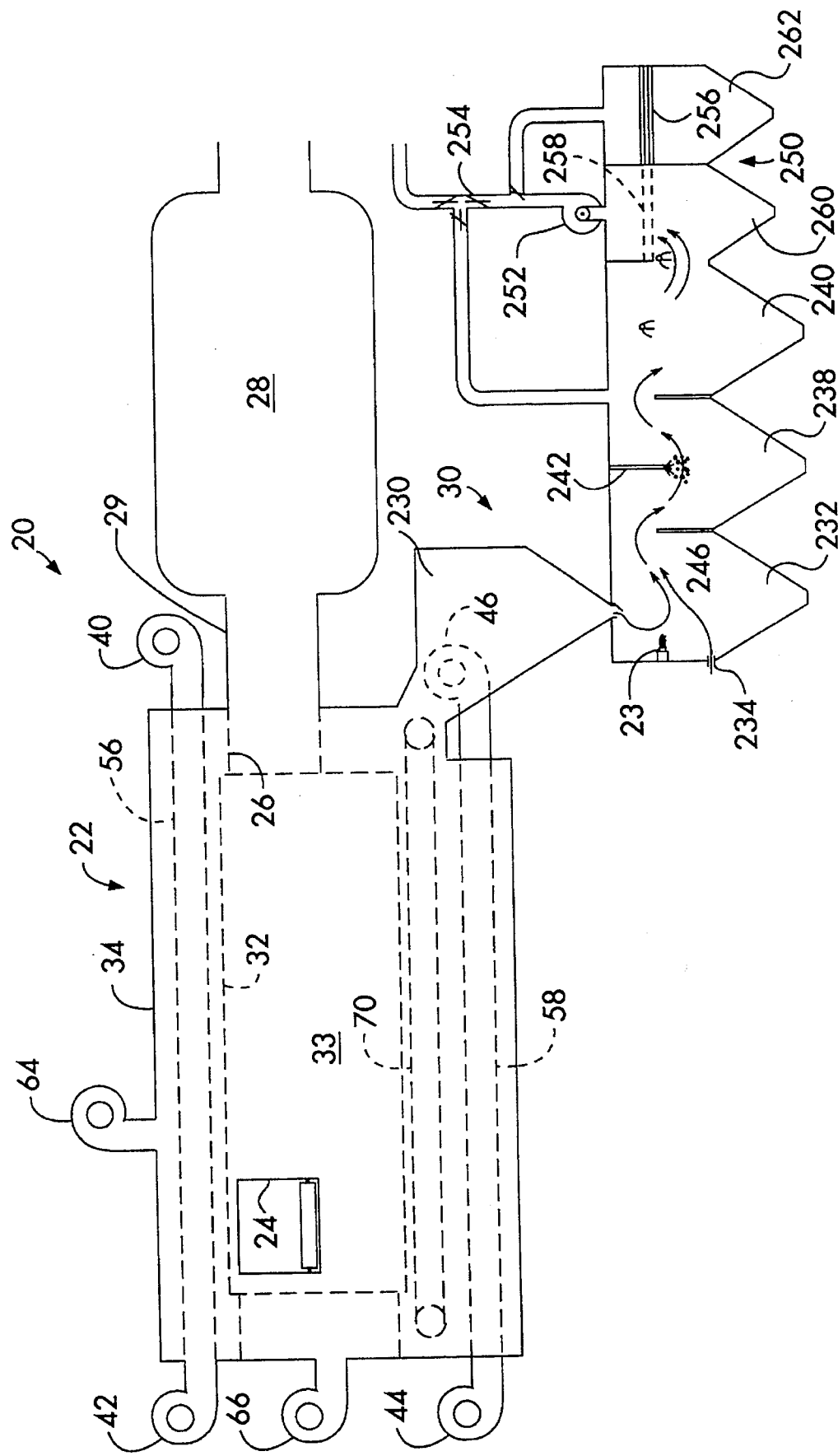
FIG. 1 is a side elevational view of a solid waste incinerator system in overview, including combustion apparatus in accordance with the invention in the form of a tunnel type combustion chamber.

Referring initially to FIG. 1 for an overview, a solid waste material incinerator system 20 embodying the invention includes high temperature combustion apparatus, generally designated 22, having a solid waste material entry port 24, a hot exhaust gas exit port 26, an exhaust gas system generally designated 28, a flue 29 connecting the port 26 to the exhaust gas system 28, and an ash collection system, generally designated 30. The exhaust gas system 28 comprises, for example, a heat exchanger, a boiler for generating steam for power and/or a magnetohydrodynamic (MHD) electric generator.

The combustion apparatus 22 more particularly comprises a horizontal, tunnel-like combustion chamber 32 within which a pneumatically-suspended combustion zone 33 is defined, and an outer containment structure 34. In the embodiment of FIG. 1, the combustion chamber 32 has walls made of adjacent tubes, described hereinbelow in detail with reference to FIGS. 2, 3, 4A, 4B, 5, 6 and 7, and the interiors of these tubes are pressurized by tube supply blowers. By way of example, a total of eight tube supply blowers are provided, blowers 40, 42, 44 and 46 visible in FIG. 1, and additional tube supply blowers 48, 50, 52 and 54, described hereinbelow with reference to FIG. 2. Pressurized by these eight tube supply blowers are four main tube supply ducts 56 and 58 (FIGS. 1 and 2) and 60 and 62 (FIG. 2).

In addition, at least one outer containment supply blower 64 is provided, connected for pressurizing the outer containment structure 34. Preferably, the outer containment structure 34 is zoned, and there is thus at least one additional outer containment structure blower 66 to facilitate individual zone airflow control.

Within the combustion apparatus 22 is an air-cooled combustion chamber conveyor system 70, also termed an ash conveyor system, which serves the dual purposes of conveying heavy objects through the combustion apparatus 22, which heavy objects are too heavy for the pneumatically suspended combustion zone 33, and of conveying non-combusted particles to the ash collection and treatment system 30.

Figure 2:
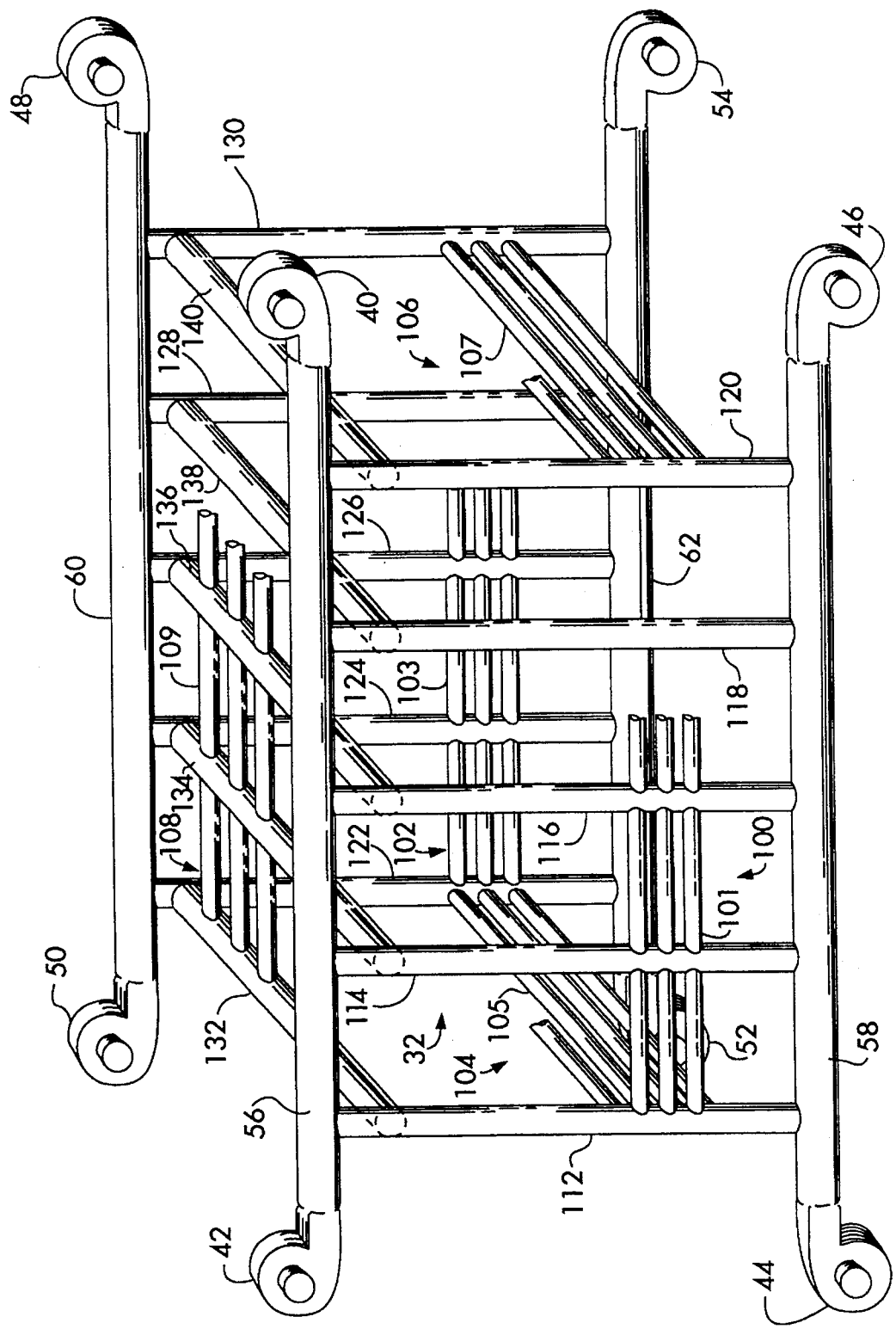
FIG. 2 is a three dimensional representation of tube walls defining a combustion chamber, and including a pressurized air supply system.

With reference now to FIG. 2 in particular, the combustion chamber 32 is defined by walls comprising longitudinally mounted slotted steel tubes pressurized by the eight tube supply blowers 40, 42, 44, 46, 48, 50, 52 and 54 via the main tube supply ducts 56, 58, 60 and 62. More particularly, in the FIG. 2 orientation the near sidewall 100 of the combustion chamber 32 comprises a plurality of adjacent slotted wall tubes 101 connected for pressurization by the tube supply blowers, and the far sidewall 102 of the combustion chamber 32 comprises another plurality of adjacent slotted wall tubes 103 likewise connected for pressurization by the tube supply blowers. An inlet end endwall 104 of the combustion chamber 32 comprises a plurality of pressurized adjacent slotted wall tubes 105, and an outlet end endwall 106 of the combustion chamber 32 comprises a plurality of slotted wall tubes 107. Similarly, the top or ceiling 108 of the combustion chamber 32 comprises a plurality of pressurized adjacent slotted ceiling tubes 109, likewise connected for pressurization by the tube supply blowers.

For supplying the interior of the slotted wall and ceiling tubes 101, 103, 105, 107 and 109, connected to the four main tube supply ducts 56, 58, 60 and 62 are secondary tube supply ducts 112, 114, 116, 118 and 120 for the near sidewall 100, extending vertically between supply ducts 56 and 58; secondary tube supply ducts 122, 124, 126, 128 and 130 for the far sidewall 102, extending vertically between main supply ducts 60 and 62; and secondary supply ducts 132, 134, 136, 138 and 140 for the ceiling 108, extending horizontally between respective pairs 112,122; 114,124; 116,126; 118,128 and 120,130 of the vertically extending secondary supply ducts. The secondary supply ducts 112 and 122 additionally supply the slotted tubes 105 of the inlet end endwall 104, and the secondary supply ducts 120 and 130 additionally supply the slotted tubes 107 of the outlet end endwall 106. The slotted wall and ceiling tubes 101, 103, 105, 107 and 109 are connected between the various secondary tube supply ducts as represented in FIG. 2.

It will be appreciated that the particular tube supply arrangement depicted in FIG. 2 is representative only, and is subject to wide variation in particular designs embodying the invention. For example, different numbers of tube supply blowers may be employed, the ducting system may differ, and zone control over the pressure within different portions of the tube wall structure may be employed.

The actual construction of the combustion apparatus 22 will now be described in greater detail with reference to FIGS. 3, 4A, 4B, 5, 6 and 7.

As noted hereinabove, the invention eliminates or reduces the need for refractory materials to contain the extreme temperatures produced in the combustion chamber 32 by employing the pneumatically suspended combustion zone 33, generally represented by its center in the lateral cross section of FIG. 6. In overview, pressurized air from the slotted sidewall tubes 101 and 103, the end wall tubes 105 and 107 and the ceiling tubes 109 supplies a high volume of combustion air, and additionally keeps the heat of combustion away from the walls.

Figure 6:
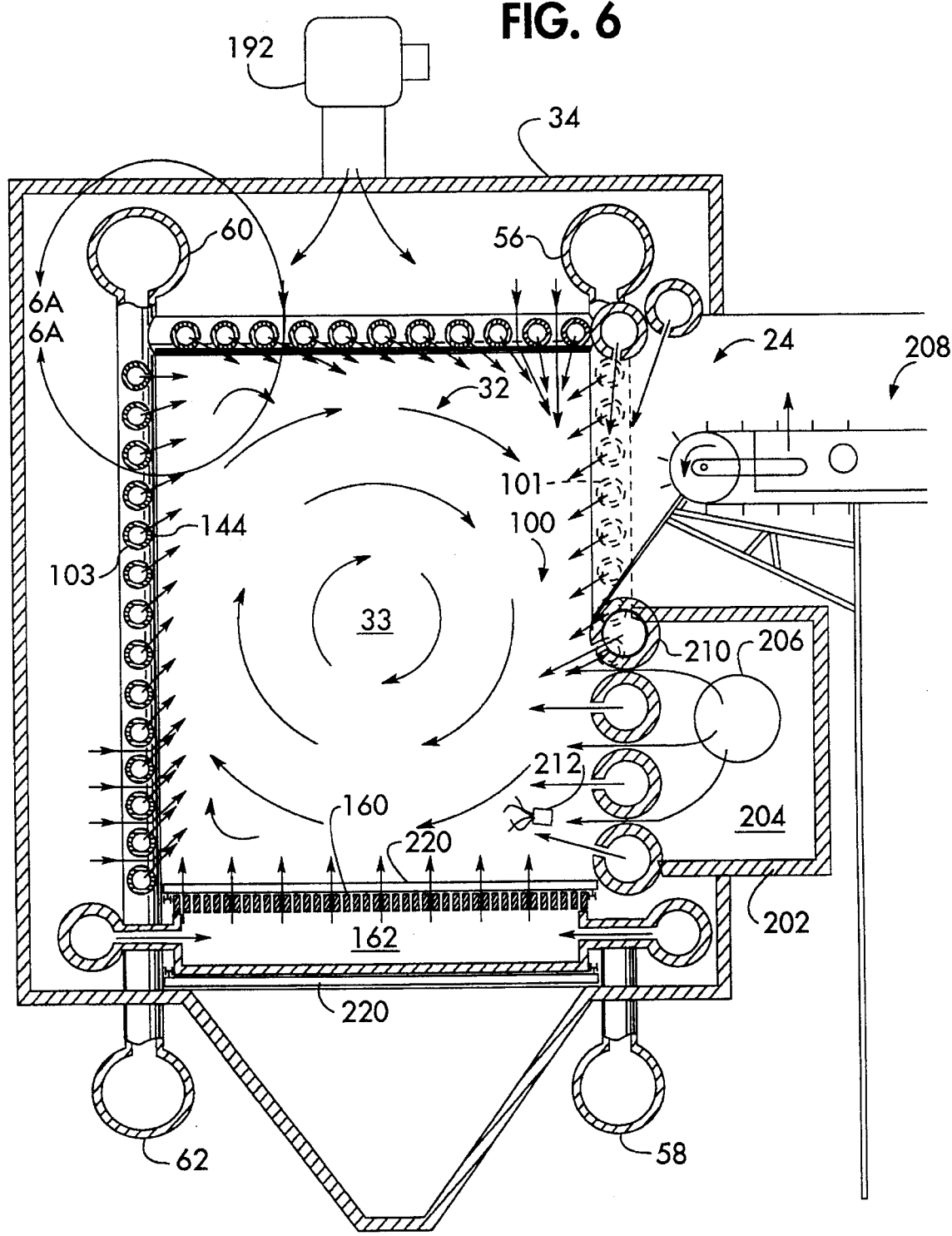
FIG. 6 is a lateral cross section taken on line 6—6 of FIGS. 3, 4A and 4B.
Figure 7:
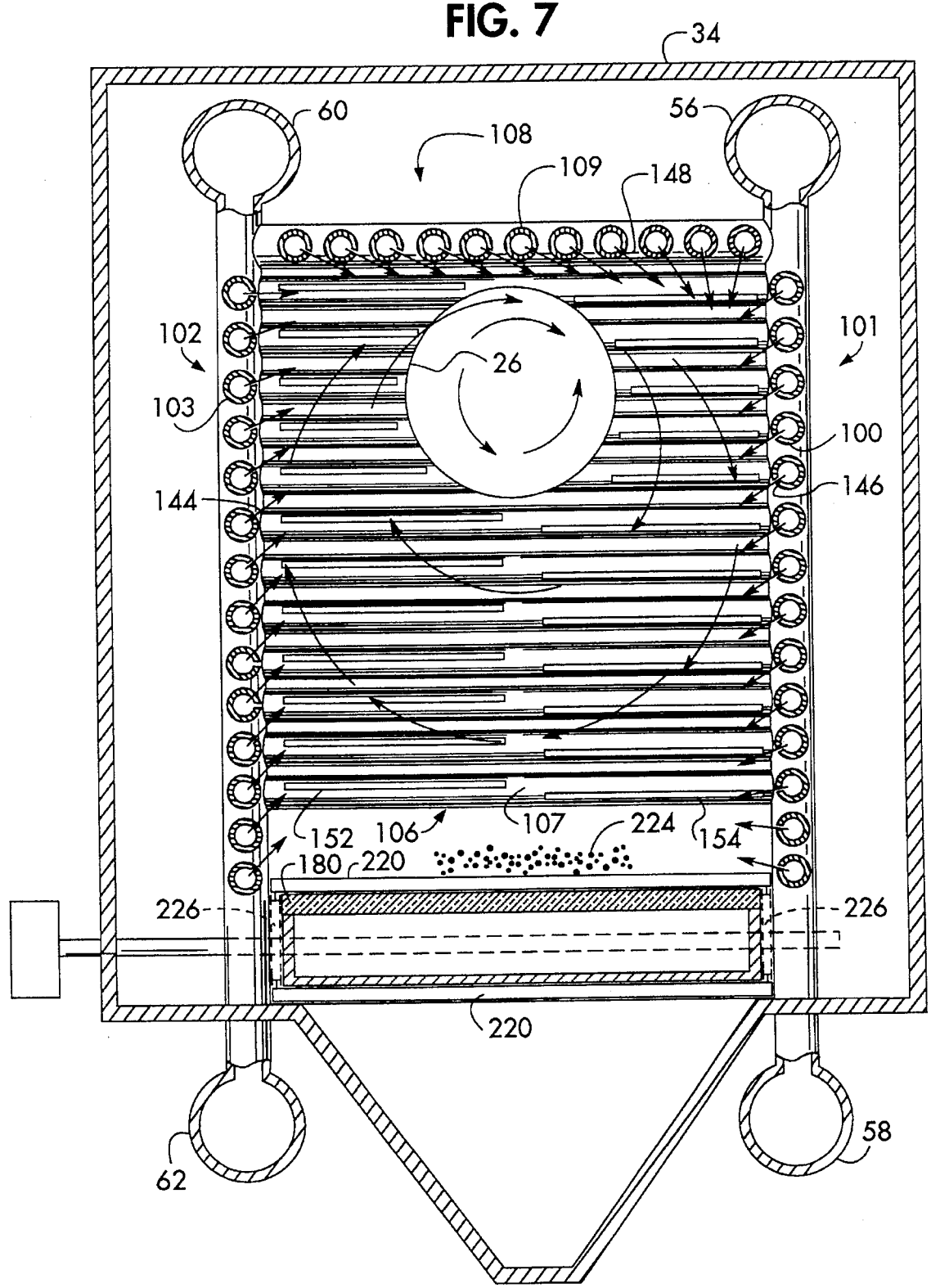
FIG. 7 is a similar lateral cross section taken on line 7—7 of FIGS. 3, 4A and 4B.

More particularly, and with particular reference to the lateral cross sections of FIGS. 6 and 7, the walls of the tubes 103 comprising the combustion chamber 32 far sidewall 102 have slots 144 oriented generally towards the combustion zone 33, the walls of the tubes 101 comprising the combustion chamber 32 near sidewall 100 have slots 146 oriented generally towards the combustion zone 33, and the walls of the tubes 109 comprising the combustion chamber 32 ceiling 108 have slots 148, likewise oriented generally towards the combustion zone 33. FIG. 4B and the enlarged FIG. 5 show the slots 144 of the far sidewall 102 tubes 103 as viewed from the interior of the combustion chamber 32, and in addition show, in cross section, slots 150 in the walls of the tubes 105 comprising the inlet end endwall 104. FIG. 7, in addition to the slots 144, 146 and 148 in the tubes 103, 101 and 109 respectively comprising the combustion chamber 32 sidewalls 102 and 100 and ceiling 108, shows two columns of slots 152 and 154 in the walls of the tubes 107 comprising the outlet end endwall 106, also oriented generally towards the combustion zone 33.

To promote swirling gas flow motion within the combustion zone 142, the slots 144, 146 and 148 in the wall and ceiling tubes 103, 101 and 109 are generally oriented at an angle with reference to the perpendicular direction of the walls 102 and 100 and ceiling 108 such that airflow is directed as indicated by the various arrows in FIGS. 6 and 7.

The combustion chamber 32 inlet end and outlet end endwalls 104 and 106 have different slot arrangements to promote swirling gas flow motion within the combustion zone 142. As may be seen in FIG. 7, the columns of slots 152 and 154 in the walls of the tubes 107 comprising the outlet end endwall 106 are respectively oriented upwardly and downwardly, consistent with the orientation of the slots 144 and 146 in the tubes 103 and 101 of the respectively adjacent sidewalls 102 and 100.

The slots in the walls of the tubes 105 comprising the inlet end endwall 104 are correspondingly oriented in a manner which promotes the swirling gas flow motion within the combustion zone 142. Thus, in the longitudinal sections of FIGS. 4B and 5, particularly the enlarged view of FIG. 5, the particular slots 150 which are depicted in the tubes 105 comprising the inlet end endwall 104 are nearest the far sidewall 102, and accordingly are oriented upwardly. Although not specifically illustrated, those portions of the tubes 105 nearest the near sidewall 100 have slots which are oriented upwardly.

In addition to the slots 144, 146, 150, 152 and 148 in the tubes comprising the combustion chamber 32 walls 102, 100, 104 and 106 and ceiling 108, there is a slotted floor grate 160 (FIG. 6) mounted longitudinally and comprising the top of a floor grate plenum chamber 162. The floor grate plenum chamber 162 has a bottom wall 164, and sidewalls 166 and 168, and is pressurized by means of a separate blower (not shown) and a plenum chamber supply duct system including longitudinal ducts 170 and 172 (FIG. 6) running along either side, and connected to the floor grate plenum chamber 162 through respective sets of supply ports 174 and 176. For convenience of illustration, in FIGS. 4A and 4B the floor grate plenum chamber 162 supply ports 174 and 176 are shown as circular openings in the respective floor grate plenum chamber 162 sidewalls 166 and 168. FIG. 4B happens to be taken on a section intermediate a pair of floor grate 160 elements, and a side surface 160' of one of the floor grate elements 160 is accordingly visible in FIG. 4B. The floor grate elements 160 by way of example comprise strips of steel ¼ inch thick and three inches wide oriented on edge and running substantially the entire length of the combustion chamber 32, up to a terminating point 178 near the outlet end, where a solid slab 180 of refractory material (FIGS. 4B and 7) is employed to facilitate ash collection.

Air flowing upwardly from the flow grate plenum chamber 162 serves several purposes, including aiding in pneumatic suspension of the combustion zone 33, contributing to the supply of excess combustion air, cooling the flow grate 160, and cooling the conveyor 70.

In addition to the air supply for the slotted wall tubes 101, 103, 105, 107, ceiling tubes 109 and floor grate 160, the outer containment structure 34 has an interior 190 which is pressurized with combustion air by means of a representative and appropriately connected outer containment structure supply blower 192. Thus, combustion air is directed between the wall and ceiling tubes 101, 103, 105, 107 and 109 into the combustion chamber 32. The combustion air directed between the wall and ceiling tubes is in addition to combustion air directed from the tube interiors through the tube slots 144, 146, 148, 150 and 152, and serves the dual purposes of providing additional cooling for the tubes and facilitating control over the combustion process. The slotted wall and ceiling tubes 101, 103, 105, 107 and 109, while adjacent, accordingly are spaced from each other to accommodate the passage of combustion air therebetween. A typical spacing is ⅛ inch between tubes which are eight inches in diameter.

Preferably, the outer containment structure 34 is zoned so that air volume may readily be adjusted through different portions of the combustion chamber 32 walls 100, 102, 104 and 106, and ceilings 108.

Figure 3:
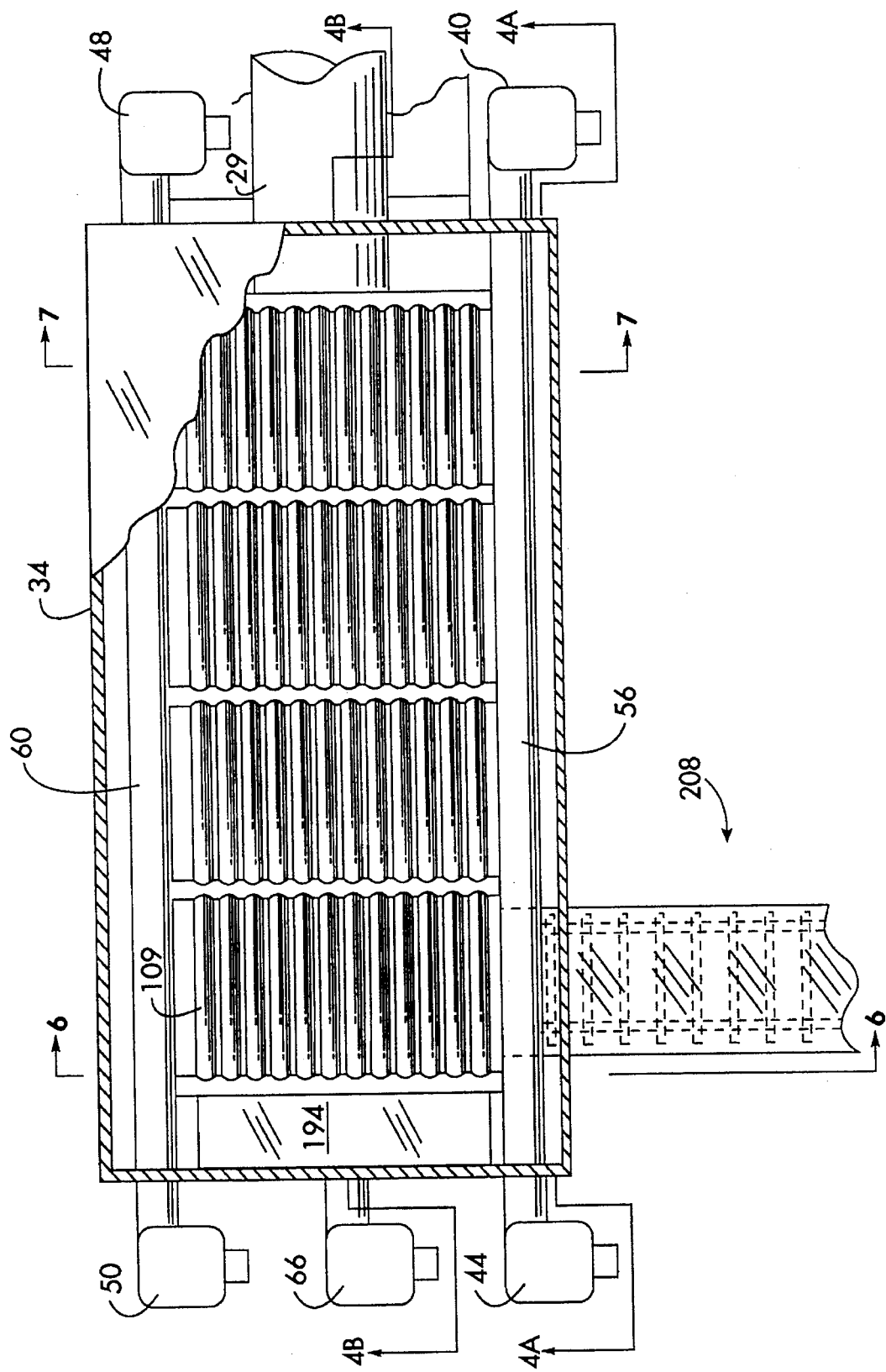
FIG. 3 is a top view, with portions cut away, of the combustion apparatus of FIG. 1.
Figure 4A:
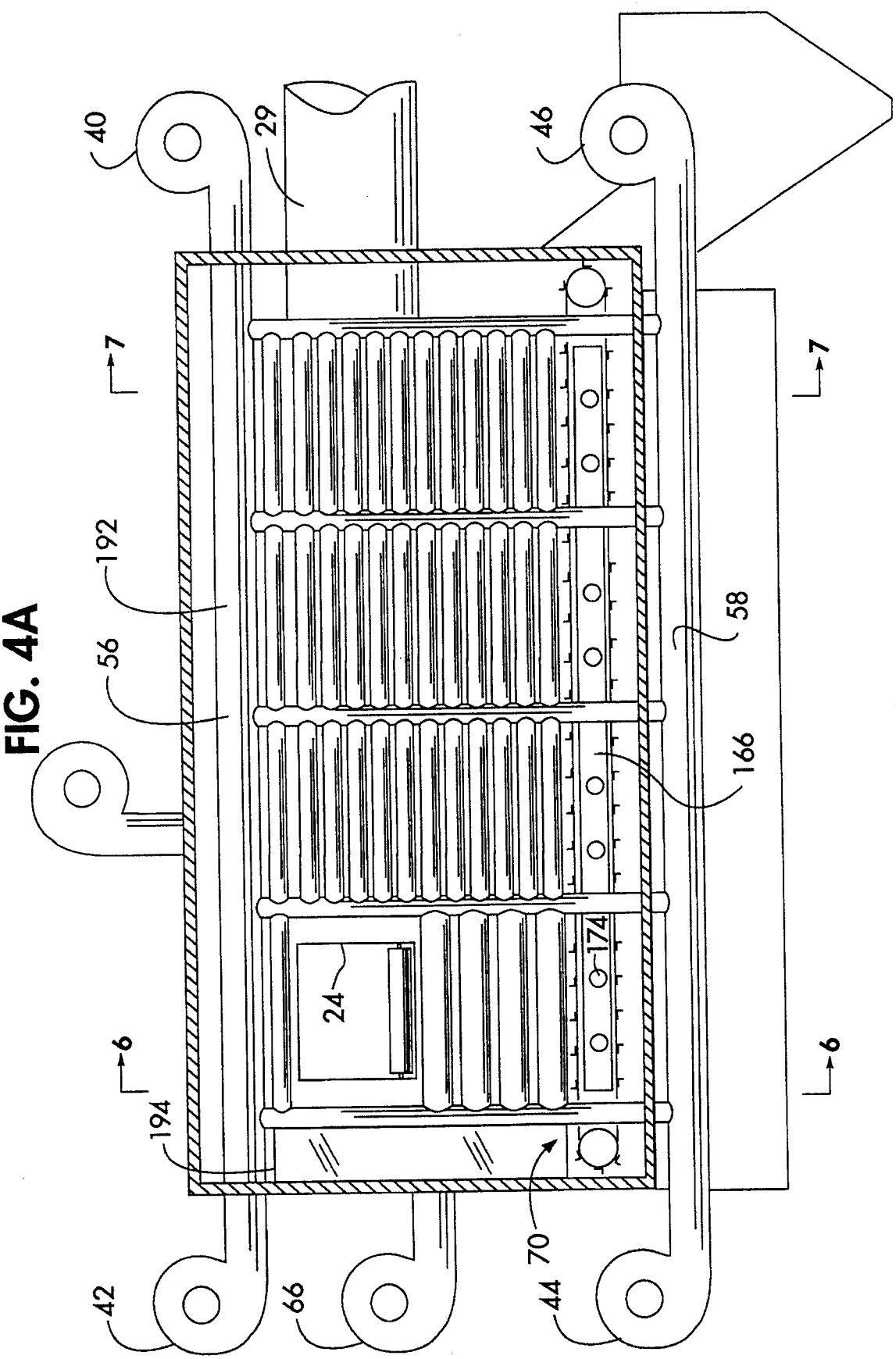
FIGS. 4A and 4B are longitudinal sections, respectably taken on lines 4A—4A and 4B—4B of FIG. 3.
Figure 4B:
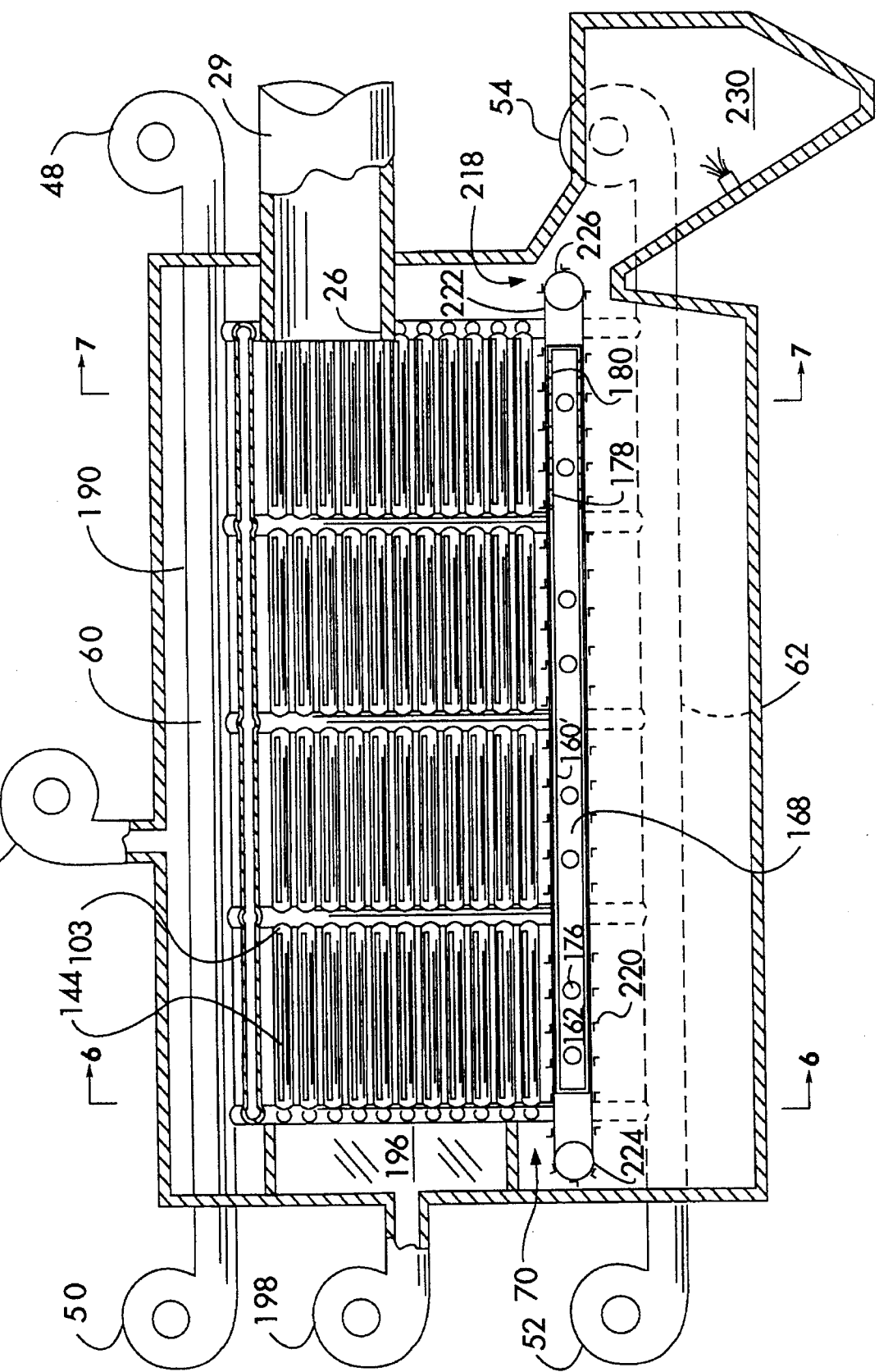

Thus, and with reference to FIGS. 3, 4A and 4B, an outer containment structure zone is defined by an outer containment substructure or chamber 194 (FIGS. 3 and 4A) having a pressurized interior 196 (FIG. 4B) and supplied with combustion air by means of a zone blower 198. The chamber 194 is mounted at the end of the combustion chamber 32 directly opposite the exhaust port 26. Pressurized ambient air is forced into the chamber 194 and then between the tubes 105 of the inlet end endwall 104 at a higher volume compared to any other portion of the outer containment structure 34 in order to force the swirling turbulent motion of the combustion zone 33 away from the solid waste conveyor entry point 24 (where hydrocarbon fuel may also be introduced), towards the opposite end of the combustion chamber 32 to the exhaust port 26 and conveyor 70 exit.

Figure 6A:
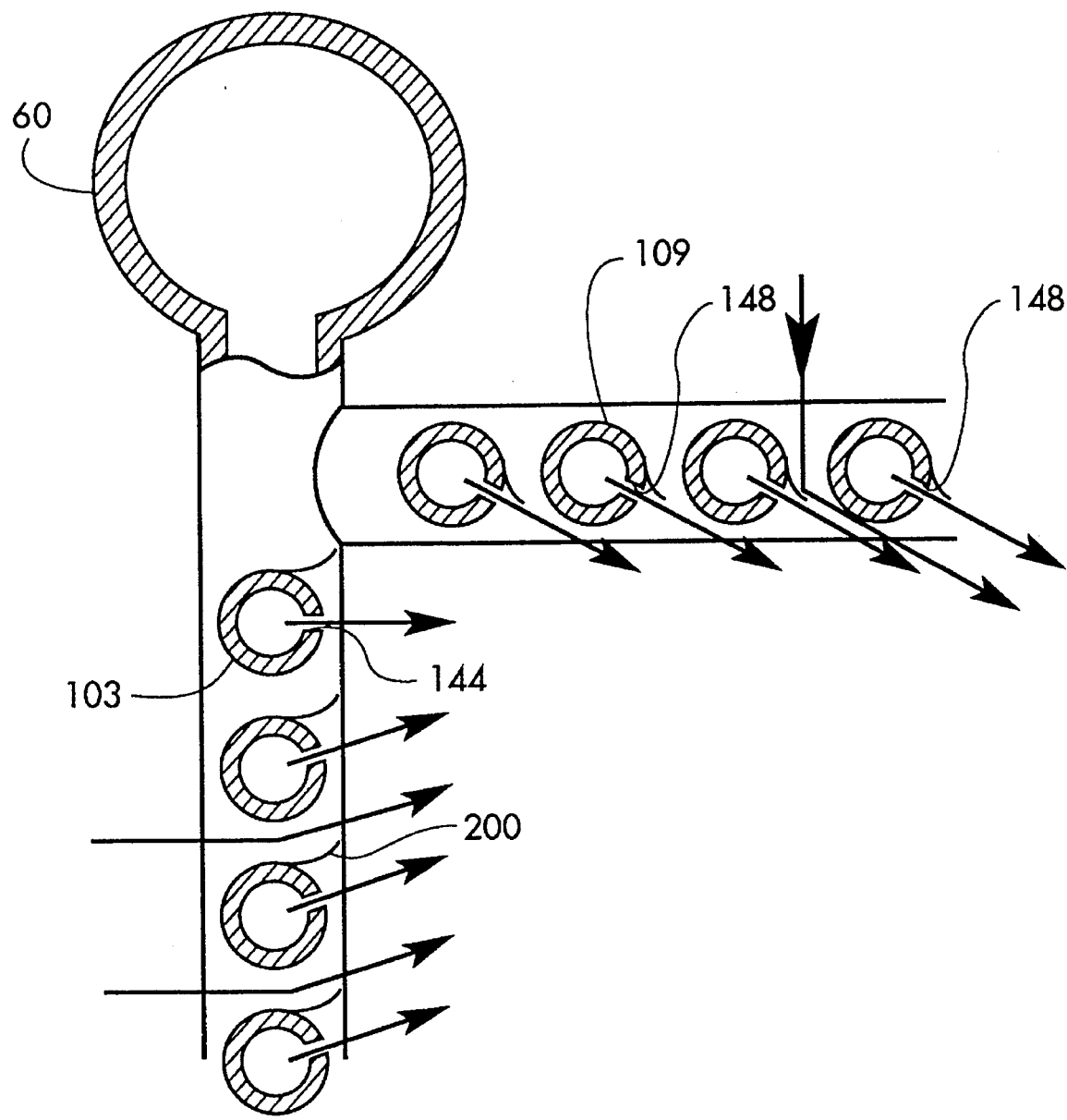
FIG. 6A is an enlarged view of portion 6A-6A of FIG. 6.

As described hereinabove, the tube slots 144, 146, 48, 150 and 152 are oriented so as to promote swirling gas flow motion within the combustion zone 33. In addition, affixed to and positioned generally between the wall and ceiling tubes 101, 103, 105, 107 and 109 are airflow-directing vanes, represented in the enlarged view of FIG. 6A, as vanes 200. The vanes 200 correspond in orientation with the slots of the particular tubes to which the vanes 200 are affixed, thus reinforcing and augmenting the promotion of swirling gas flow motion. In addition, the vanes 200 direct airflow over the outsides of the tubes, cooling the tubes, as well as providing an air curtain effect further insulating the tubes and reducing erosion.

In this regard, it will be appreciated that the combustion air forced from the containment zone chamber 194 between the slotted tubes 105 comprising the inlet end endwall 104 at a relatively higher volume compared to other portions of the outer containment structure 34, in conjunction with vanes 200 affixed to the slotted tubes 105, aids in promoting the swirling motion of the combustion zone 142 at the outset.

Another outer containment structure zone is defined by a chamber 202 (FIG. 6) having an interior 204 and pressurized by means of a duct entry point 206 located immediately below the solid waste material entry port 24, which is supplied with preheated solid waste material by a solid waste conveyor system, generally designated 208, described hereinbelow with reference to FIGS. 8 and 9. The outer containment structure zone defined by the chamber 202 forces combustion air into the combustion chamber 32 between somewhat enlarged slotted wall tubes 210 in this particular region. These wall tubes 210 are enlarged for the purpose of producing a high velocity air stream which, by pneumatic assist, propels pieces of solid waste material into a circular pattern. Thus, as solid waste is injected through entry port 24 downwardly into the combustion chamber 32, pieces of solid waste material free fall into the high velocity air stream and are propelled horizontally towards the opposite side 102 of the combustion chamber 32, where the pieces encounter an upwardly flowing air stream from the slots 144 in the tubes 103, thus beginning the circular pattern of the combustion process. In addition, hydrocarbon fuel in the form of powdered coal may be introduced through the chamber 202.

Represented generally by element 212 in FIG. 6 are conventional fuel supply and ignition devices, such as gas supply jets (propane or natural gas), oil injection nozzles, and spark gaps. Typically these devices 212 are located immediately below the solid waste material entry port 24, but may be at any point or points within the combustion chamber 32. Advantageously, gas supply jets and sparking devices are mounted at various locations along the lower portion of the combustion chamber 32.

As noted hereinabove, there is an air-cooled combustion chamber conveyor system 70 or ash conveyor 70 which serves the dual purposes of conveying heavy objects and of conveying non-combusted particles through an ash exit port 218 to the ash collection and treatment system 30. The conveyor 70 more particularly comprises a series of conveyor elements in the form of laterally extending angle irons 220 affixed at either end to a pair of conveyor chains 222 driven by sprockets represented at 224 and 226. The angle irons 220 also serve as scraper elements. Preferably, the chains 222 are the type commonly employed for driving the tracks of tracked vehicles, and which accordingly have attachment points suitable for the angle irons 220. Although not illustrated, in order to avoid overheating of the chains 222, preferably there is a chain channel into which cooling air is injected. The conveyor 70 is driven by one or more variable speed, reversible electric or hydraulic motors (not shown). Conveyor 70 speed may vary according to the type and size of waste material being combusted.

Ash collection is facilitated by the solid slab 180 of refractory material (FIGS. 4B and 7) in the floor of the combustion chamber 32 near the outlet end endwall 106. Thus, unlike the region above the slotted floor grate 160 with its upwardly-directed airflow, ash 224 is free to settle onto the slab 180, as is represented in FIG. 7, to be pushed by the conveyor 70 angle irons 220 into the ash collection system 30. In addition, centrifugal force generated by the generally circular gas flow motion of the swirling combustion zone 33, aided by gravity, assists in the deposition of ash 224 on the refractory material slab 180 for conveying into the ash collection system 30.

Very briefly, the ash collection system 30 includes a primary ash collection compartment 230 and a secondary ash/metal collection compartment 232 wherein combustion gases are mixed with air drawn through a vent 234, and additionally are cooled by a water spray or mist 236. There are several additional secondary ash/metal separation compartments 238 and 240, upper baffles 242 and 244, lower baffles 246 and 248, and an alternate media filter system 250 through which the mixture of air and combustion gases is drawn by an ash collection blower 252. The ash collection blower 252 forces the air/gas mixture through a duct 254 to an exhaust gas flue. The secondary ash/metal separation compartments 232, 238 and 240 and the filter system 250 include collection hoppers equipped with waste gates (not shown) designed for manual or automatic opening devices. The alternate media filter system 250 includes a set of filter media panels 256 mounted on a horizontal track 258 between a collection compartment 260 and a filter backwash compartment 262. The filter media panels 256 can be moved one at a time into the filter backwash compartment 262 for selective cleaning, while maintaining operation.

Figure 8:
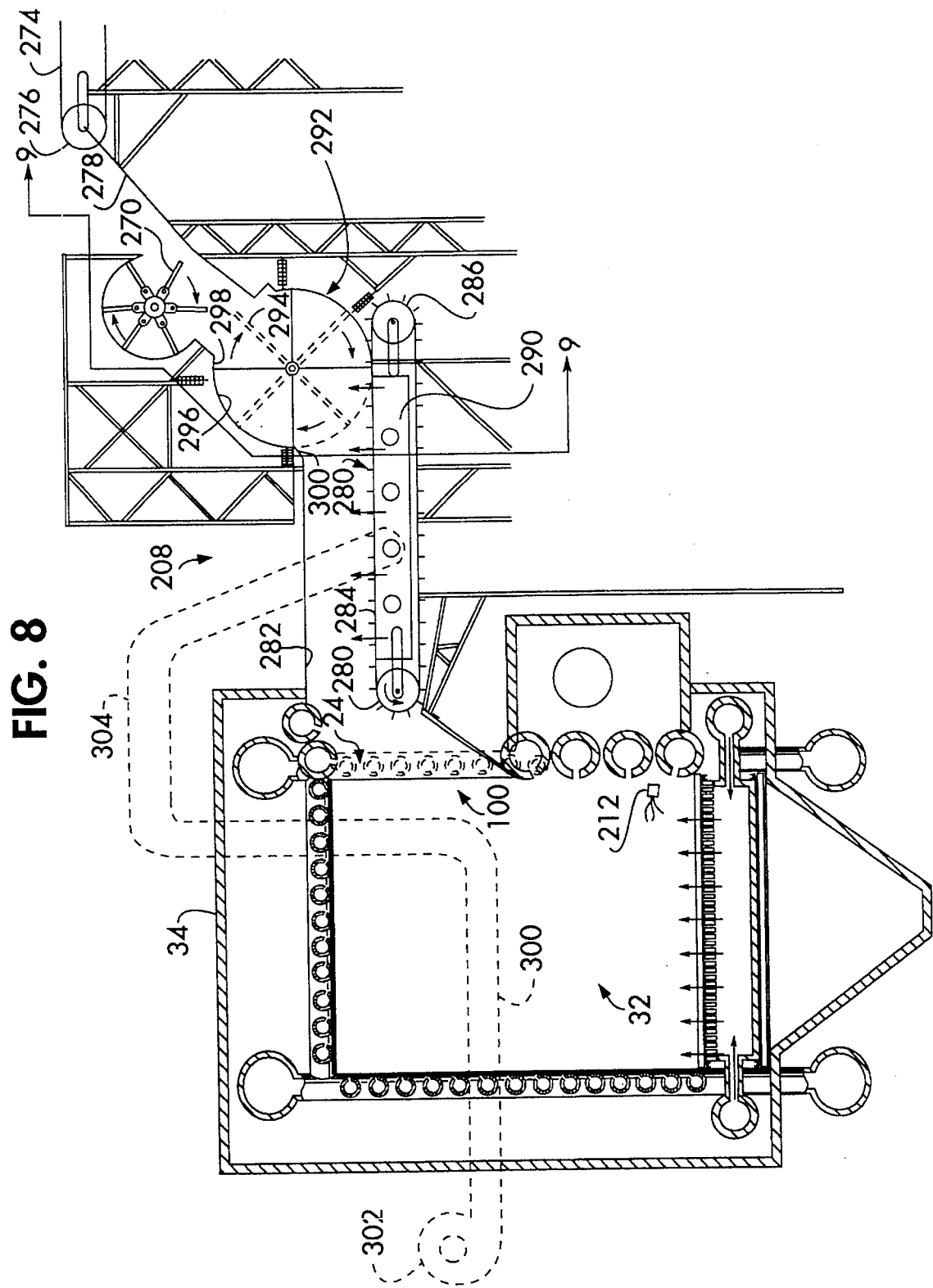
FIG. 8 is a view similar to that of FIG. 6, showing further details of the waste material supply conveyor structure.
Figure 9:
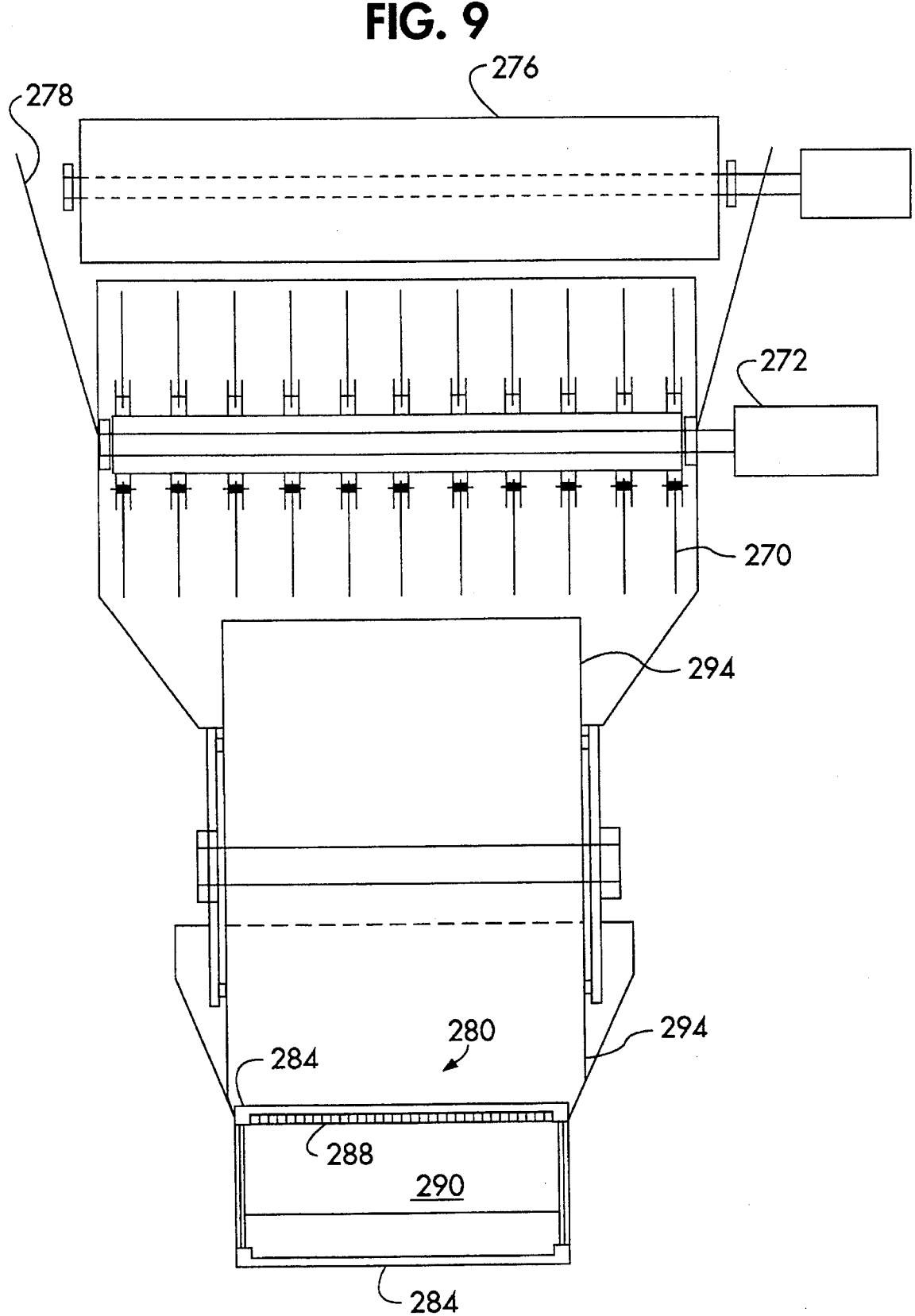
FIG. 9 is a view taken generally along line 9—9 of FIG. 8 showing further details of the material supply conveyor structure.

Referring now in addition to FIGS. 8 and 9, the solid waste material conveyor system 208 serves generally to introduce appropriately-sized, preheated solid waste material into the tunnel-like combustion chamber 32. The solid waste material is introduced through the port 24, which is located in the near sidewall 100 near the inlet end endwall 104, at the opposite end with respect to the outlet end endwall 106 having the hot exhaust gas exit port 26 and the ash collection and treatment system 30. Solid waste material, in addition to falling by gravity from the conveyor system 208 into the combustion chamber 32, preferably is injected by pneumatic assist. The solid waste entry port 24 is sized to accommodate the type and size of solid waste objects injected into the tunnel-like combustion chamber 32. For example, forest waste products and municipal foliage waste may range in size up to eighteen inches cross-sectional diameter and seventeen inches in length. Bagged household garbage and trash objects up to thirty inches cross-sectional diameter may be injected into the tunnel-like combustion chamber. Solid waste objects exceeding these cross-sectional diameters are shredded by employing a hammermill type shredder 270 driven by a motor 272.

More particularly, the solid waste material conveyor system 208 includes a primary waste material supply conveyor 274 of any convenient construction, and terminating at a roller 276, which introduces solid waste material along an inclined chute 278 into the hammermill shredder 270.

A secondary waste material supply conveyor 280 communicates directly with the interior of the combustion chamber 32 through the port 24, and is contained within a heated and pressurized tunnel-like duct 282. The secondary waste material supply conveyor 280 is essentially identical in construction to the combustion chamber conveyor 70, and thus includes a series of angle iron conveyor elements 284 connected to chains driven by sprockets 286, in turn driven by a variable speed motor (not shown). The conveyor elements 284 move along a slotted floor grate 288, similar in construction to the floor grate 160 of the combustion chamber conveyor 70. Below the floor grate 288 is a pressurized plenum chamber 290, which provides pressure for propelling hot air to preheat waste material, and for slightly pressurizing the duct 282 to provide airflow for pneumatically assisted injection of waste material into the combustion chamber 32. Thus, to provide pneumatic assist for solid waste material injection through the port 24, a higher pressure is maintained in the tunnel-like waste material supply conveyor duct 282 compared to the combustion chamber 32.

To maintain a pressure differential between the interior of the tunnel-like duct 282 and the ambient, while permitting the introduction of shredded solid waste material, a revolving door type structure 292 is provided having vanes 294 rotating within a generally cylindrical housing 296. The cylindrical housing 296 has an entry port 298 and an exit port 300, which delivers shredded solid waste material to the secondary waste material conveyor 280.

It is a feature of the invention that waste material moving along the secondary supply conveyor 280 is preheated prior to being introduced into the combustion chamber 32. Thus, heated air is forced from the plenum chamber 290 below into and around the shredded solid waste material as material moves along the slotted floor grate 288 towards the combustion chamber 32. At the very least this accomplishes drying and heating of the shredded solid waste material. Preferably, the temperature of shredded solid waste material is raised to a temperature near its flash point as the solid waste material is injected into the combustion chamber 32 by gravity and pneumatic assist.

There is an element for providing hot air for waste material preheating in the representative form of a heat exchanger 300 within the combustion chamber 32. The heat exchanger 300 may comprise a tube of high temperature refractory material, or a steel pipe with a refractory material protective coating. The heat exchanger 300 may alternatively be located within the exhaust gas system 28 or the flue 29 (FIG. 1). Although less efficient, a separately-fueled heater (not shown) may be employed instead of the heat exchanger 300. In the illustrated embodiment, a blower 302 on the inlet (cold) side of the heat exchanger 300 is provided to force ambient air through the heat exchanger 300, and a hot air duct 304 connects the outlet side of the heat exchanger 300 to the plenum chamber 290 below the secondary waste material supply conveyor 280 running within the heated tunnel-like duct 282.

As noted hereinabove with reference to FIG. 1, the exhaust gas system 28 comprises, for example, a heat exchanger, a boiler for generating steam for power and/or a magnetohydrodynamic (MHD) electric generator. MHD electric power generation and a steam turbine may be employed in tandem. MHD electric power generation requires relatively high gas temperatures to achieve thermal ionization so that the gas is sufficiently conductive, and the combustion apparatus of the invention achieves such temperatures. In addition, the threshold temperature for ionization can be lowered by appropriately "seeding" the hot gas flowing through an MHD electric generator, and the invention advantageously inherently can provide such "seeding" due to various constituents present in municipal solid waste.

In most cases, the exhaust gas system 28 will include an exhaust gas scrubber of appropriate configuration. Typically, an electrostatic precipitator is employed to remove fly ash. In applications where combustion apparatus of the invention is retrofitted to convert existing coal-fired power plants, no additional equipment is necessary for preparing exhaust gases for entry into the atmosphere; existing exhaust gas scrubbing equipment can be retained.

For operation, the combustion process is begun by injecting hydrocarbon fuel through the chamber 202 or oil injection nozzles, solid waste material through the entry port 24, or both, along with gas assist (propane or natural gas), ignited by sparking devices represented as element 212. Once temperatures reach a level where the combustion process is self-sustaining, the gas assist is turned off. Thus, once combustion temperatures reach approximately 1500° F. (approximately 800° C.), the combustion of coal and solid waste material begins immediately upon injection into the combustion chamber 32.

Relatively large mass solid waste material objects, such as objects exceeding two pounds and cross-sectional diameters of six inches or more, which are injected into the combustion chamber 32 generally free fall to the combustion chamber conveyor 70, whereupon exposure to extreme temperatures causes combustible material to rapidly explode from the object surface. Large mass objects are thus converted into super heated gas which becomes part of the swirling turbulent combustion zone 33, and travels longitudinally along the combustion chamber 32.

Lightweight combustible objects injected through the entry port 24, such as cardboard, paper, plastics and household garbage, move towards the center of the combustion chamber 32 by pneumatic assist. As combustion occurs, these lightweight combustible objects move in the swirling turbulent combustion zone 33 through the combustion chamber 32. Combustion is complete prior to the exit of combustion gases through the exhaust port 26.

Thus, combustible solid waste material is totally consumed by combustion temperatures in excess of 2400° C. (4352° F.), which are achieved as a result of the high volume of excess combustion air.

Noncombustible metal objects such as steel cans and steel tire rims and wheels become molten, and eventually free fall by gravity into the ash collection system 30 from the discharge end of the air cooled conveyor 70.

These noncombustible particles, other than fly ash and molten metal particles, settle as represented at 224 to the non-slotted portion 180 of the combustion chamber 32 floor made of refractory material, assisted in part by centrifugal force created by the circular motion of the gas flow within the combustion zone 33. The angle iron conveyor scraper elements 220 move the noncombustible particles 224 through the ash exit port 218 into the primary ash collection compartment 230 by gravity and pneumatic assist. Combustion gases are drawn from the combustion chamber 32 through the ash exit port 218 providing pneumatic assist to the non-combusted particles. The noncombustible and molten metal particles then fall by gravity and pneumatic assist into the secondary ash and metal separation/collection compartment 232. Air is drawn from the vent 234 which cools the molten metal as the metals fall by gravity.

Lighter non-metallic particles are drawn by pneumatic assist into the secondary compartment 232. Within the secondary compartment 232 the water mist 236 is sprayed downward into the non-combusted particles as the particles move through the compartment 232 and over the baffle 246. The particles accordingly absorb the liquid, and some become heavy enough to fall by gravity into the collection hopper below, rather than being carried by the gas stream.

This process is repeated as non-combusted particles pass through the baffles and are subjected to a similar misting process in the compartments 238 and 240. The mixture of air and combustion gases eventually reaches the alternate media filter system 250, drawn by the blower 252, and passes as particulate-free gas through the flue 254.

It will be appreciated that the solid waste incinerator system 20 of FIGS. 1–9 can be employed for power generation, a well as waste incineration. Thus, a power plant can advantageously generate electric power while, at the same time, disposing of municipal solid waste, for highly cost-effective operation. The combustion apparatus 22 can either be employed in new power plant designs, or be retrofitted to existing power generating plants.

Figure 10:
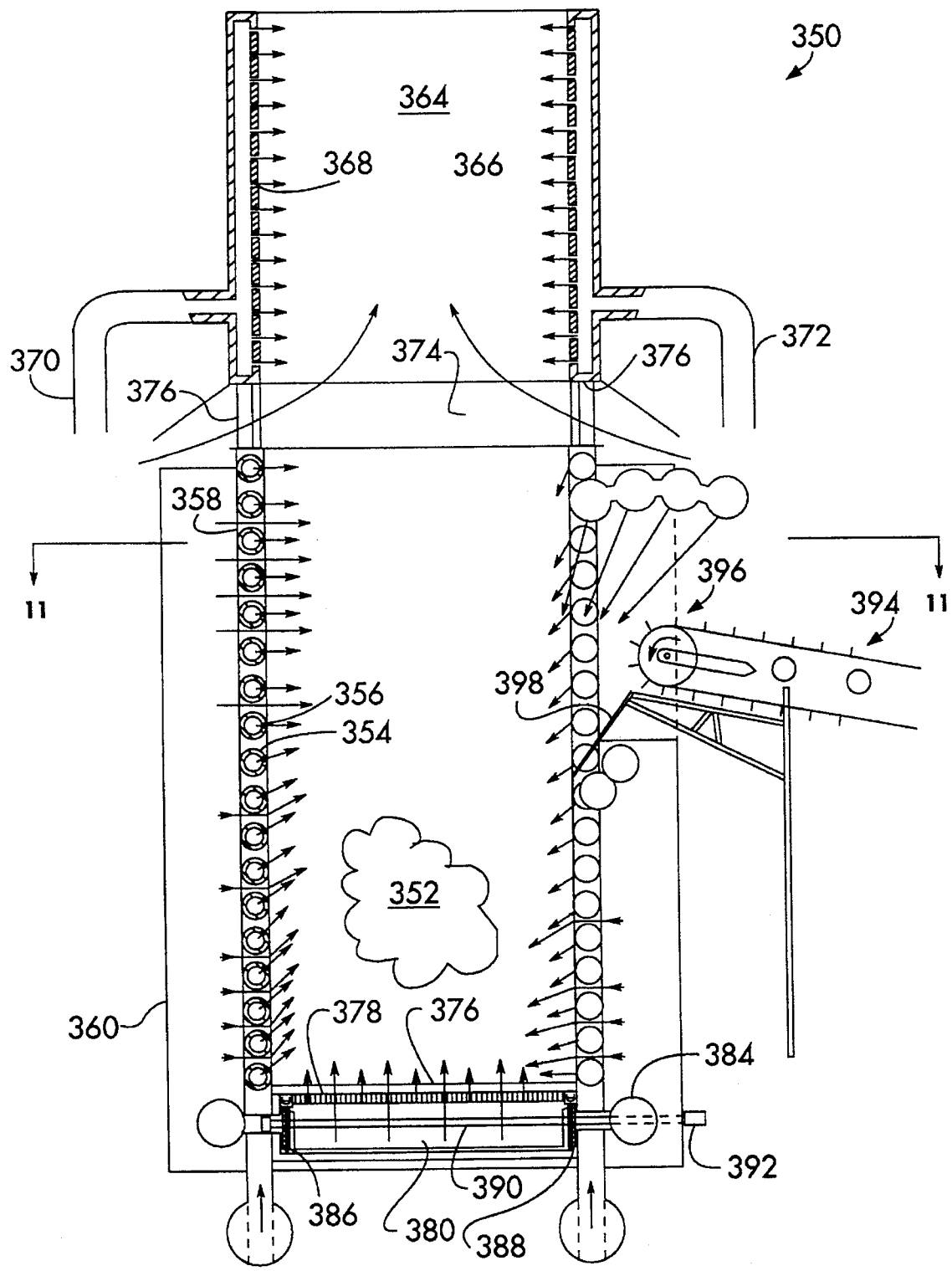
FIG. 10 is an end view, partly in section, of a second embodiment of the invention, in the form of a vertically-extending incinerator primarily for wood and vegetation debris.
Figure 11:
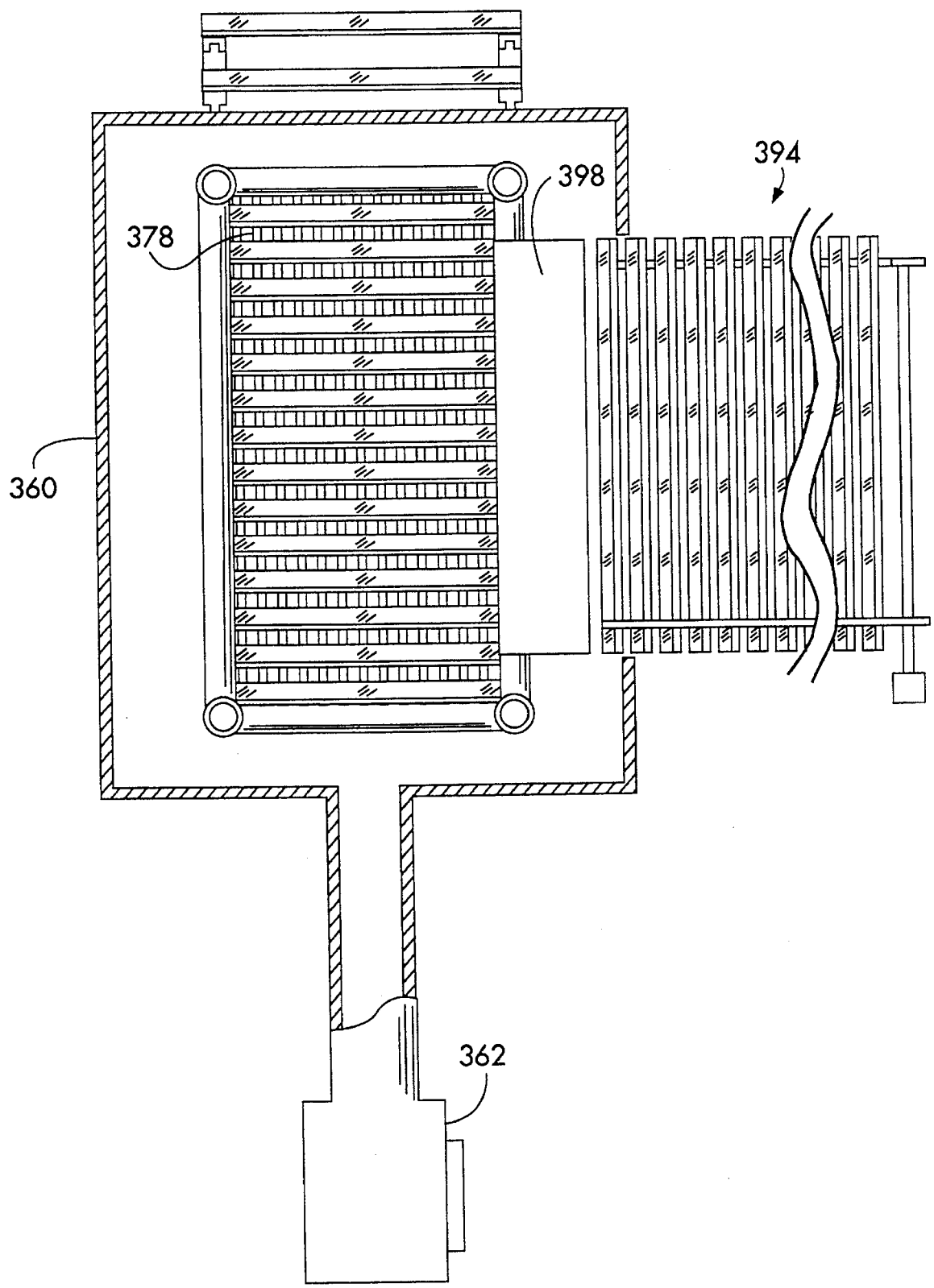
FIG. 11 is a view, looking down, taken on line 11—11 of FIG. 10.

With reference now to FIGS. 10 and 11, a second embodiment of the invention is in the form of a vertically-extending incinerator 350, primarily for wood and vegetation debris. The incinerator 350 of FIGS. 10 and 11, like the combustion apparatus 22 of FIGS. 1–9, employs a pneumatically suspended combustion zone 352 created by having streams of combustion air directed upwardly from a floor grate and from the sides of a combustion chamber, and wherein relatively high combustion temperatures are sustained by providing a high volume of excess combustion air, the same combustion air which maintains the pneumatically suspended combustion zone 352. The incinerator 350 of FIGS. 10–12 effects complete combustion of vegetation type debris, thus essentially eliminating "smoke".

The incinerator 350, like the combustion apparatus 22 of FIGS. 1–9, includes pressurized slotted tubes 354 defining walls 356 of a combustion chamber 358, within which is a pneumatically suspended combustion zone 352. A pressurized outer containment structure 360 surrounds the slotted tubes 354 defining the combustion chamber 358, and air streams are forced between the slotted tubes 354 as in the combustion apparatus 22 of FIGS. 1–9. The interiors of the hollow wall tubes 352 are pressurized by a suitable ducting arrangement (not shown), and the outer containment chamber 360 is pressurized by means of a blower 362 (FIG. 11).

Above the combustion chamber 356, at the top of the incinerator 350, is an exhaust stack 364 defined by hollow, pressurized walls 366 having horizontal slots 368. Pressurized air supply ducts 370 and 372 supply air to the interior of the exhaust stack 364 hollow wall 366. Below the exhaust stack 364 is a draft air intake hood 374, having openings 376 through which ambient air is drawn. Combustion of any remaining particulate matter occurs in the exhaust stack 364. High temperature combustion within the combustion zone 352, followed by combustion within the exhaust gas stack 364, results in essentially complete elimination of smoke.

At the bottom of the combustion chamber 358 is an ash conveyor 376 driven over a slotted floor grate 378 above a pressurized plenum chamber 380. The conveyor 376 of the incinerator 350 is substantially identical to the combustion chamber conveyor 70 of the embodiment of FIGS. 1–9, except that the conveyor 376 is primarily for transporting ash out of the combustion chamber 356, rather than assisting also in moving large objects through a tunnel-like combustion chamber, as in the incinerator system 20 of FIGS. 1–9. The floor grate plenum chamber 380 is pressurized by means of supply ducts 382 and 384, and the conveyor 376 is driven by chain sprockets 386 and 388 connected by a shaft 390 and driven by a variable speed motor 392.

The vegetation incinerator 350 of FIGS. 10 and 11 includes a conveyor 394 for introducing waste material through an opening 396 and over a feedplate 398 into the combustion chamber 356. The conveyor 394 as depicted in FIGS. 10 and 11 is a relatively simple conveyor. However, as in the embodiment of FIGS. 1–9, a more elaborate waste material conveyor system can be employed if desired, including preheating of waste material, and a tunnel-like pressurized waste material supply conveyor chamber.

Figure 12:
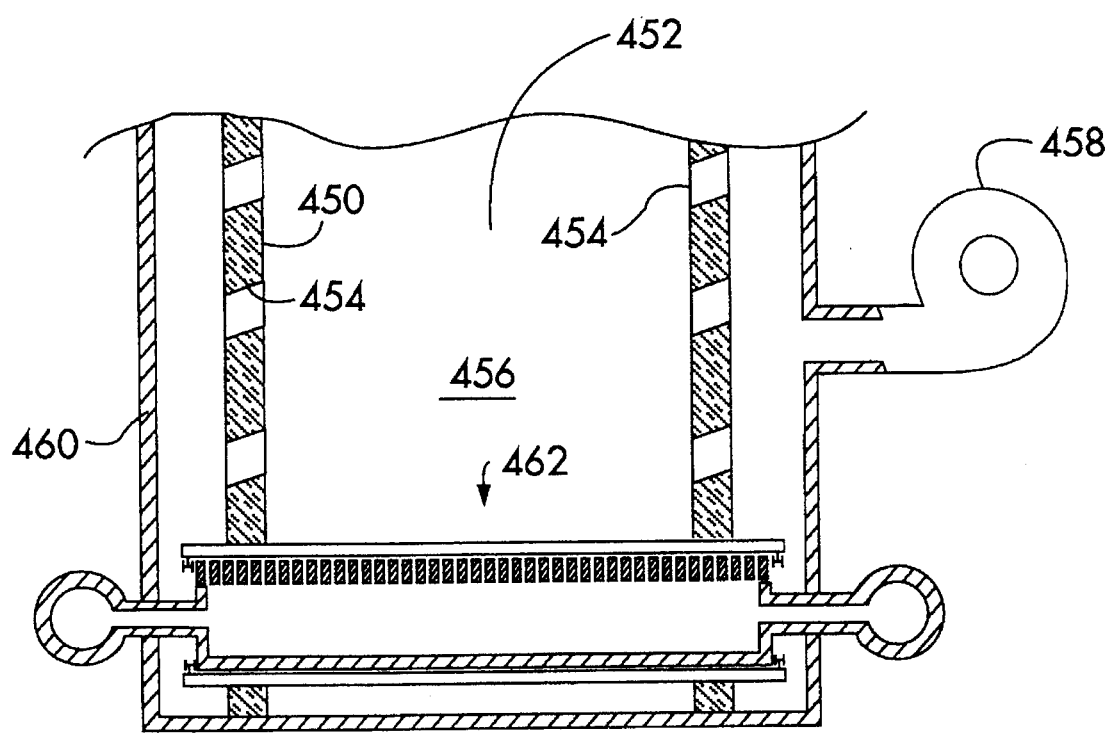
FIG. 12 is a cross-sectional representation of an alternative combustion chamber wall construction.

Referring finally to FIG. 12, depicted is another embodiment of the invention wherein walls 450 of a combustion chamber 452 are made of a refractory material, and include a multiplicity of openings 454 oriented generally towards a combustion zone, generally designated 456. Thus, the walls 450 of the FIG. 12 embodiment are an alternative to the walls and ceiling 100, 102, 104, 106 and 108 of the combustion apparatus 22 of FIGS. 1–9 comprising slotted wall and ceiling tubes 101, 103, 105, 107 and 109. In FIG. 12, a blower 458 is in gas flow communication with the openings 454, preferably by means of a pressurized outer containment structure 460, comparable to the outer containment structure 34 of the combustion apparatus 22 of FIGS. 1–9. At the bottom of the combustion chamber 452 of FIG. 13 is a conveyor and floor grate structure 462, which may be identical to the structure of FIG. 8.

During operation of the FIG. 12 embodiment, pressurized air forced through the openings 454 supplies excess combustion air to the combustion zone 456 as in the previously described embodiments, and, in addition, keeps the heat of combustion away from the walls 450.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Combustion apparatus comprising:

walls defining a combustion chamber having a pneumatically suspended combustion zone;

at least a portion of each of said walls comprising a plurality of adjacent tubes having tube interiors and tube walls;

said tube walls having openings oriented generally towards the combustion zone; and at least one tube supply blower connected to said tubes for pressurizing said tube interiors with combustion-supporting gas such that combustion-supporting gas streams are directed out of said openings to at least partially define the combustion zone and to force the heat of combustion away from said walls.

2. Combustion apparatus in accordance with claim 1, wherein said openings are slots.

3. Combustion apparatus in accordance with claim 1, wherein said openings are oriented so as to induce swirling gas flow movement within said combustion zone.

4. Combustion apparatus in accordance with claim 1, wherein the combustion-supporting gas is air.

5. Combustion apparatus in accordance with claim 1, wherein said tubes comprise metal, and at least portions of said walls are free of refractory materials.

6. Combustion apparatus in accordance with claim 1, wherein said tubes comprise a refractory material.

7. Combustion apparatus in accordance with claim 1, wherein said tubes extend horizontally.

8. Combustion apparatus in accordance with claim 2, wherein said tubes and said slots extend horizontally.

9. Combustion apparatus in accordance with claim 1, wherein the combustion gas is combustion air.

10. Combustion apparatus in accordance with claim 1, which further comprises a floor grate having spaced grate elements between which combustion-supporting gas streams are directed upwardly.

11. Combustion apparatus in accordance with claim 10, which further comprises conveyor elements moving over said grate for conveying heavy objects through said apparatus.

12. Combustion apparatus in accordance with claim 11, comprising a tunnel-like structure wherein solid waste material is introduced at one end and exit ports for hot gas and ash are provided at the other end.

13. Combustion apparatus in accordance with claim 1, which further comprises an element for introducing material to be combusted into said combustion zone, and a hot combustion-supporting gas supply for preheating the material.

14. Combustion apparatus in accordance with claim 1, wherein said tubes are spaced from each other.

* * * * *